US012774598B2

(12) United States Patent
Krause

(10) Patent No.: US 12,774,598 B2
(45) Date of Patent: Oct. 27, 2026

(54) BRACKET ASSEMBLY HAVING A BRACKET MEMBER WITH ATTACHMENT CLIP MEMBERS

(71) Applicant: Wolverine Enclosures, Inc., Allegan, MI (US)

(72) Inventor: G. Matt Krause, Allegan, MI (US)

(73) Assignee: WOLVERINE ENCLOSURES, INC., Allegan, MI (US)

( * ) Notice: Subject to any disclaimer, the term of this patent is extended or adjusted under 35 U.S.C. 154(b) by 2 days.

(21) Appl. No.: 19/093,199

(22) Filed: Mar. 27, 2025

(65) Prior Publication Data

US 2025/0382790 A1 Dec. 18, 2025

Related U.S. Application Data

(60) Provisional application No. 63/570,734, filed on Mar. 27, 2024.

(51) Int. Cl.
*E04B 1/38* (2006.01)
*F16B 2/22* (2006.01)

(52) U.S. Cl.
CPC ................ *E04B 1/388* (2023.08); *F16B 2/22* (2013.01); *E04B 2001/389* (2023.08)

(58) Field of Classification Search
CPC ...... E04B 1/388; E04B 2001/389; F16B 2/22; F16M 13/02; F16M 13/08; F16M 1/24
USPC .................................................... 248/231.81
See application file for complete search history.

(56) References Cited

U.S. PATENT DOCUMENTS

| | | | | |
|---|---|---|---|---|
| 6,497,396 B1 * | 12/2002 | Adams | A47G 1/20 | 248/231.91 |
| 7,581,364 B2 * | 9/2009 | Godby | E04F 13/0842 | 52/545 |
| 2013/0074431 A1 * | 3/2013 | Croasdale | E04B 1/388 | 52/309.4 |
| 2014/0250811 A1 * | 9/2014 | Krause | E04F 13/0828 | 52/309.4 |
| 2018/0010341 A1 * | 1/2018 | Krause | E04B 1/388 | |
| 2022/0220730 A1 * | 7/2022 | Bilge | E04B 1/7629 | |
| 2023/0049477 A1 * | 2/2023 | Nelson | E04F 13/0875 | |
| 2024/0167265 A1 * | 5/2024 | Krause | E04F 13/24 | |
| 2025/0101735 A1 * | 3/2025 | Melcher | E04B 1/388 | |

* cited by examiner

*Primary Examiner* — Monica E Millner
(74) *Attorney, Agent, or Firm* — The Watson IP Group; Jovan N. Jovanovic

(57) ABSTRACT

A bracket assembly comprising a bracket member and at least one attachment clip. The bracket member includes a body wall, a first end wall and a second end wall. At least one attachment clip member is attached to the second end wall. An attachment clip member is disclosed, as are methods of assembling bracket assemblies and methods of making wall structures.

20 Claims, 19 Drawing Sheets

BRACKET ASSEMBLY HAVING A BRACKET MEMBER WITH ATTACHMENT CLIP MEMBERS

CROSS-REFERENCE TO RELATED APPLICATION

This application claims priority from U.S. Patent App. Ser. No. 63/570,734 filed Mar. 27, 2024, entitled "Bracket Assembly Having A Bracket Member With Attachment Clip Members", the entire disclosure of which is hereby incorporated by reference in its entirety.

BACKGROUND OF THE DISCLOSURE

1. Field of the Disclosure

The disclosure relates in general to building systems and building construction, and more particularly, to a bracket assembly having an attachment clip member.

2. Background Art

The use of girts and the like is known in building construction. There has been a constant desire for improvements in the performance of girts on building structures. One area of focus has been on the improvement in performance with respect to isolation of components to minimize the conduction of heat or cold across building walls, ceilings and other structures.

Some solutions have been presented. Many of such solutions suffer from performance issues, cost issues, as well as issues of longevity. There has been a constant drive to improve.

SUMMARY OF THE DISCLOSURE

The disclosure in an aspect is directed to a bracket assembly. The bracket assembly comprises a bracket member and at least one attachment clip member. The bracket member is an elongated member that has a body wall, a first end wall and a second end wall. The first end wall extending from a bottom edge of the body wall. The second end wall extends from a top edge of the body wall. The first end wall is substantially perpendicular to the body wall and the second end wall is substantially perpendicular to the body wall. The body wall has a plurality of body wall central configurations along a length of the bracket member. At least one of the plurality of body wall central configurations defines a first void within the body wall with a spike member formed to extend into the first void. The spike member has a body and a tip, and is bendable so as to be at least one of oblique and perpendicular to the body wall. The second end wall has a plurality of second end wall central configurations along the length of the bracket member. At least one of the plurality of second end wall central configurations has at least one outer attachment channel formed into a distal end of the second end wall. At least one inner attachment slot disposed between a proximal and a distal end of the second end wall.

The at least one attachment clip member is positionable on an outer surface of the second end wall, and attachable to the bracket member. The at least one attachment clip member including a body, at least one channel and at least one slot. The body has an inner surface and an outer surface, along with an outer side surface and an inner side surface opposite the outer side surface and extending between the inner surface and the outer surface, with the inner surface positionable over the outer surface of the second end wall. The at least one channel coupling member is insertable into the at least one outer attachment channel with a portion extending of the at least one channel coupling member extending over an inner surface of the second end wall. The at least one slot coupling member has an arm extendable through the at least one inner attachment slot. Attachment of the at least one channel coupling member and the at least one slot coupling member attaches the at least one attachment clip member to the bracket member.

In some configurations, the bracket member further comprises a metal member formed from a single sheet. The first end wall and the body wall are defined by a first fold therebetween. The second end wall and the body wall are defined by a second fold therebetween. The first fold extending in a direction opposite of the second fold, so as to define a Z-girt configuration.

In some configurations, the at least one attachment clip member comprises a polymer.

In some configurations, the at least one attachment clip member comprises an injection molded polymer.

In some configurations, at least one of the first end wall and the second end wall further includes a second end configuration, structurally configured to facilitate the passage of a fastener therethrough for attachment of successive brackets in an end to end configuration with overlapping. The second end configuration includes a slot that has a central bulge with opposing ends extending therefrom.

In some configurations, the base wall central configuration further includes a plurality of ancillary voids positioned between adjacent first voids of at least some of the plurality of base wall central configurations.

In some configurations, the ancillary voids are each smaller than the first void.

In some configurations, the at least one inner attachment slot further comprises a pair of attachment slots that are spaced apart from each other with a central opening positioned therebetween.

In some configurations, the at least one outer attachment channel comprises a pair of outer attachment channels that are spaced apart from each other.

In some configurations, the spike member is bendable about a bend region spaced apart from the tip. The bend region facilitates the controlled bending of the spike member so as to be one of oblique and perpendicular to the body wall.

In some configurations, the at least one attachment clip member comprises a plurality of attachment clip members attached to the bracket member in a spaced apart configuration.

In some configurations, the at least one channel coupling member further comprises a raised body portion and an inward leg. The raised body portion extends from the inner surface of the body. The inward leg extends from the raised body portion so as to define a capture region between the raised body portion, the inward leg and the body of the attachment clip member.

In some configurations, the inward leg further includes an inwardly directed tab portion.

In some configurations, the at least one channel coupling member further comprises a pair of spaced apart channel coupling members.

In some configurations, the raised body portion spans from a first side surface of the body to the second side surface of the body, with the inward leg being spaced apart from the first and second side surfaces.

In some configurations, the at least one slot coupling member further comprises an arm extendable through the at least one inner attachment slot. A distal protrusion is structurally configured to engage the bracket member upon insertion so as to sandwich a portion of the bracket member therebetween.

In some configurations, the at least one second end wall central configuration further includes a central opening extending therethrough. The at least one attachment clip member further includes a central opening structurally configured to align with the central opening of the at least one end wall central configuration.

In some configurations, the central opening of the attachment clip member further includes an upstand that, when attached to the bracket member, engages the central opening of the bracket member.

In another aspect of the disclosure, the disclosure is directed to a method of assembling a bracket assembly of claim 1, the method comprising the steps of: providing a bracket member; providing a plurality of attachment clip members; attaching each of the plurality of attachment clip members to the bracket member.

In some configurations, the method further comprises the step of: directing a fastener through the bracket member and through the attachment clip member and into an outside substrate.

In some configurations, the method further comprises the step of: bending at least one spike member so as to be one of oblique and perpendicular to the body wall.

In some configurations, the method further comprises the step of: directing the at least one spike member through insulation, upon abutting the insulation against the body wall.

In another aspect of the disclosure, the disclosure is directed to a method of forming a wall with the bracket assembly of the type described herein and/or set forth above or hereinbelow comprising the steps of: providing at least two of bracket members; providing a plurality of attachment clip members; attaching at least a plurality of attachment clip members to each of the at least two bracket members; attaching a first bracket member to an outside substrate by directing a fastener through the first bracket member, and each desired attachment clip member so as to sandwich each desired attachment clip member between the outside substrate and the bracket member; attaching a second bracket member to the outside substrate by directing a fastener through the second bracket member and each desired attachment clip member so as to sandwich the desired attachment clip member between the outside substrate and the bracket member; and installing insulation onto the base substrate between the first and second bracket member.

In some configurations, the method further comprises the step of: bending at least one spike member; and directing the at least one spike member that has been bent into the insulation during the step of installing insulation.

In another aspect of the disclosure, the disclosure is directed to an attachment clip member. The attachment clip member includes a body, at least one channel and at least one slot. The body has an inner surface and an outer surface, along with an outer side surface and an inner side surface opposite the outer side surface and extending between the inner surface and the outer surface, with the inner surface positionable over the outer surface of the second end wall. The at least one channel coupling member is insertable into the at least one outer attachment channel with a portion extending of the at least one channel coupling member extending over an inner surface of the second end wall. The at least one slot coupling member has an arm extendable through the at least one inner attachment slot. Attachment of the at least one channel coupling member and the at least one slot coupling member attaches the at least one attachment clip member to the bracket member.

In yet another aspect of the disclosure, the disclosure is directed to a bracket member. The bracket member is an elongated member that has a body wall, a first end wall and a second end wall. The first end wall extending from a bottom edge of the body wall. The second end wall extends from a top edge of the body wall. The first end wall is substantially perpendicular to the body wall and the second end wall is substantially perpendicular to the body wall. The body wall has a plurality of body wall central configurations along a length of the bracket member. At least one of the plurality of body wall central configurations defines a first void within the body wall with a spike member formed to extend into the first void. The spike member has a body and a tip, and is bendable so as to be at least one of oblique and perpendicular to the body wall. The second end wall has a plurality of second end wall central configurations along the length of the bracket member. At least one of the plurality of second end wall central configurations has at least one outer attachment channel formed into a distal end of the second end wall. At least one inner attachment slot disposed between a proximal and a distal end of the second end wall.

BRIEF DESCRIPTION OF THE DRAWINGS

The disclosure will now be described with reference to the drawings wherein:

FIG. 10 of the drawings is a bottom plan view of the attachment clip member of the present disclosure;

DETAILED DESCRIPTION OF THE DISCLOSURE

Figure 1:
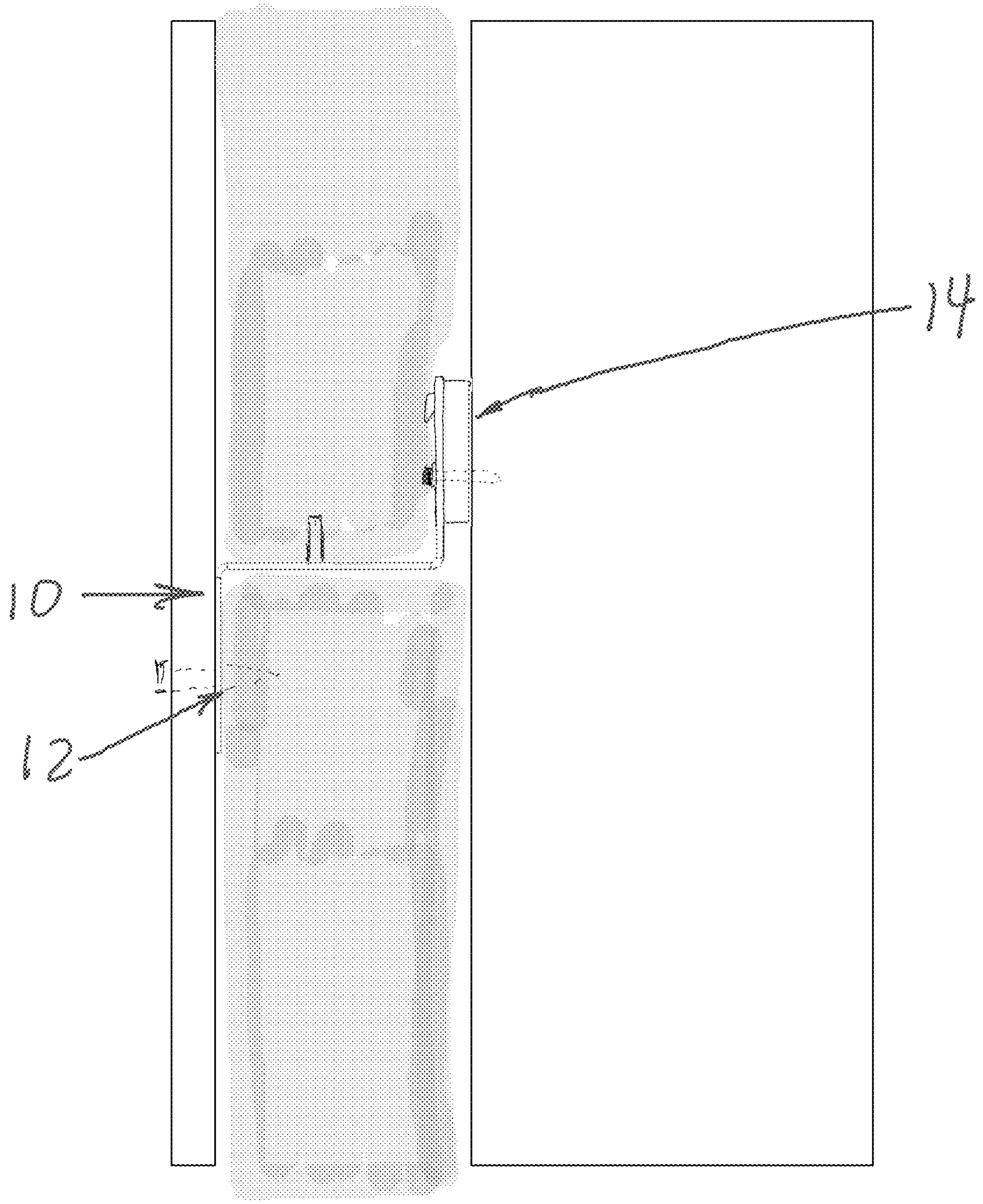
FIG. 1 of the drawings is a side elevational view of an assembled structure showing a base substrate, insulation, and cladding, with the bracket assembly of the present disclosure.
Figure 2:
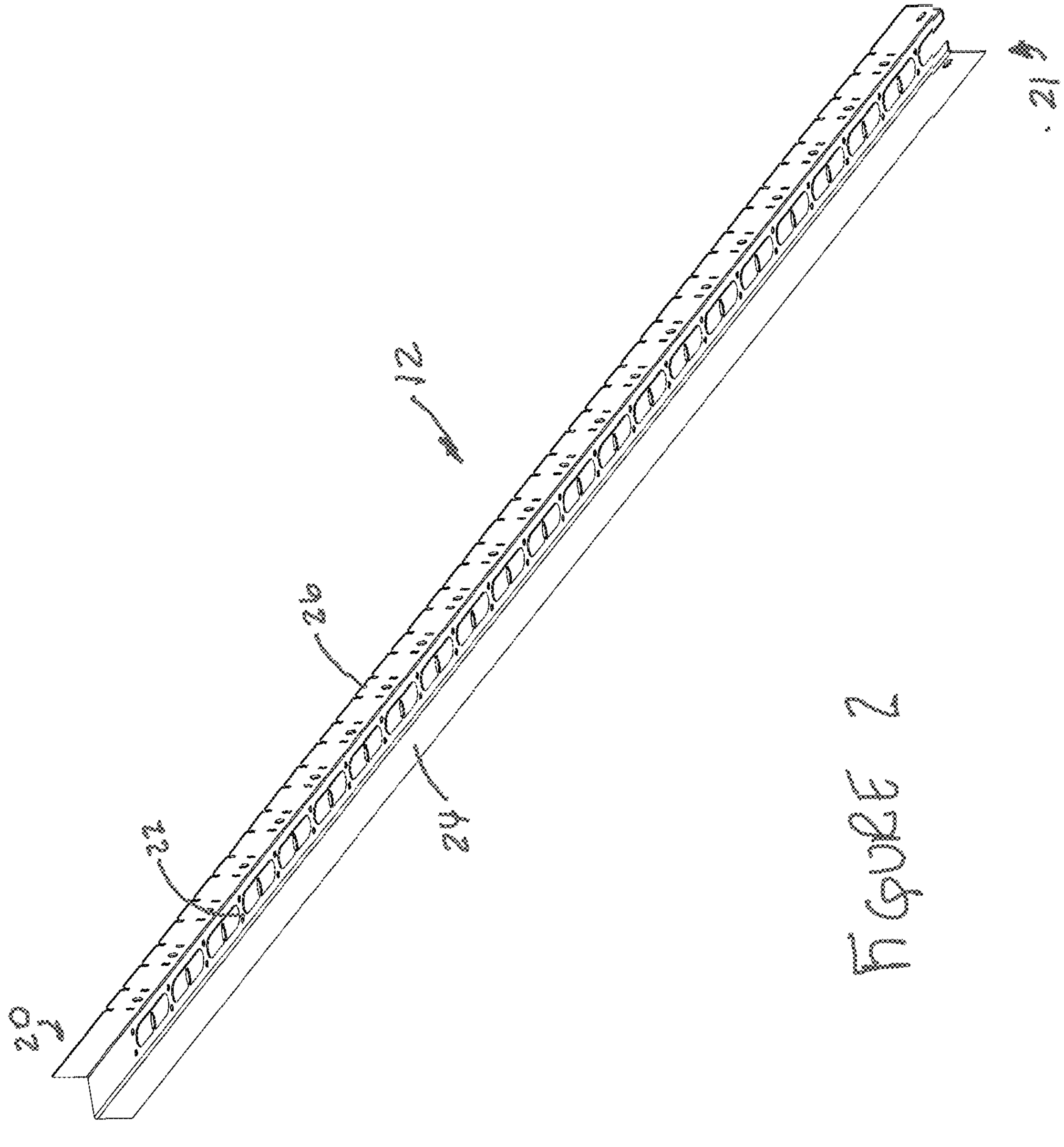
FIG. 2 of the drawings is a perspective view of the bracket member of the present disclosure.
Figure 3:
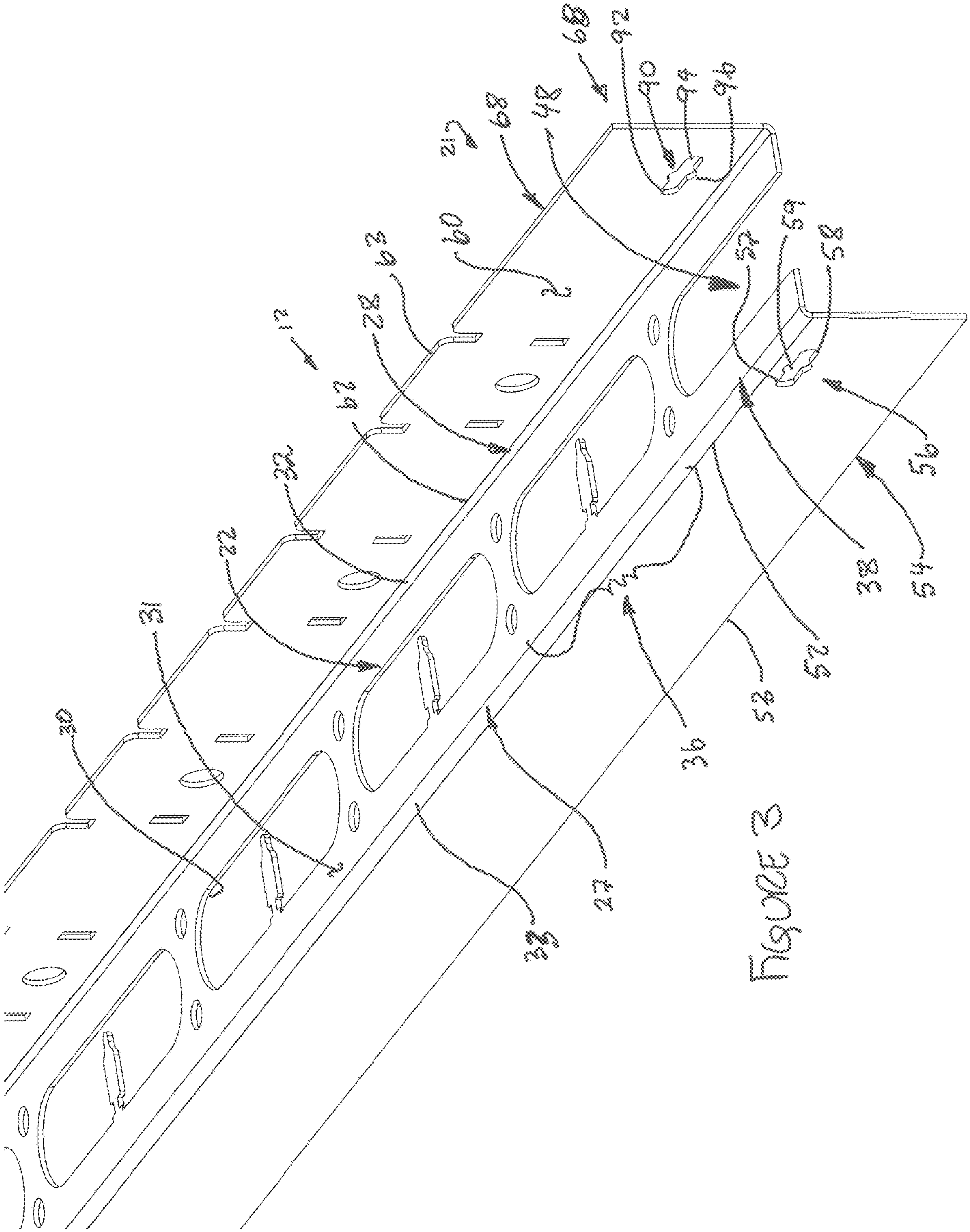
FIG. 3 of the drawings is a partial perspective view of the bracket member of the present disclosure, showing, in particular, the second end configuration thereof.
Figure 4:
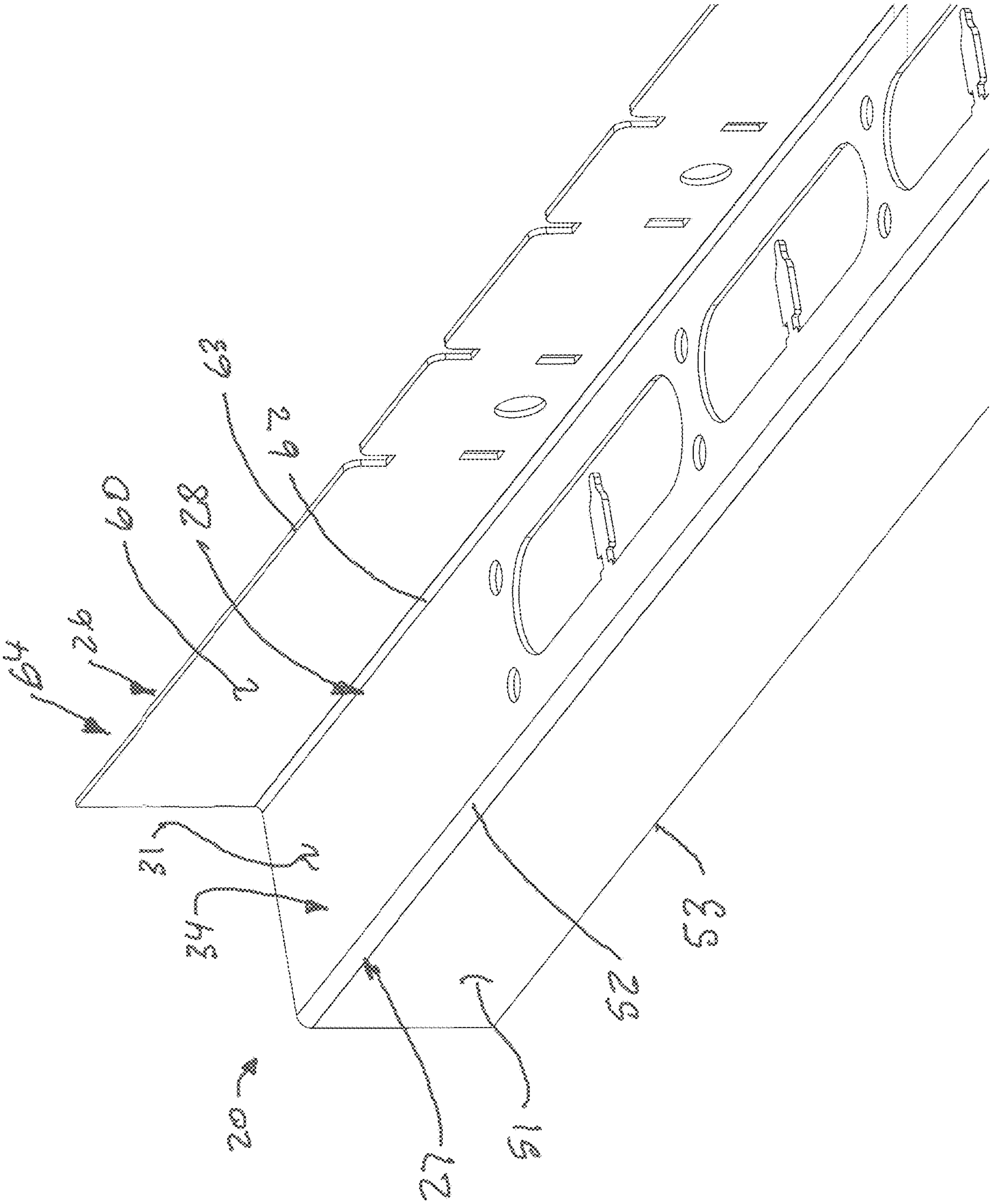
FIG. 4 of the drawings is a partial perspective view of the bracket member of the present disclosure, showing, in particular, the first end configuration thereof.
Figure 5:
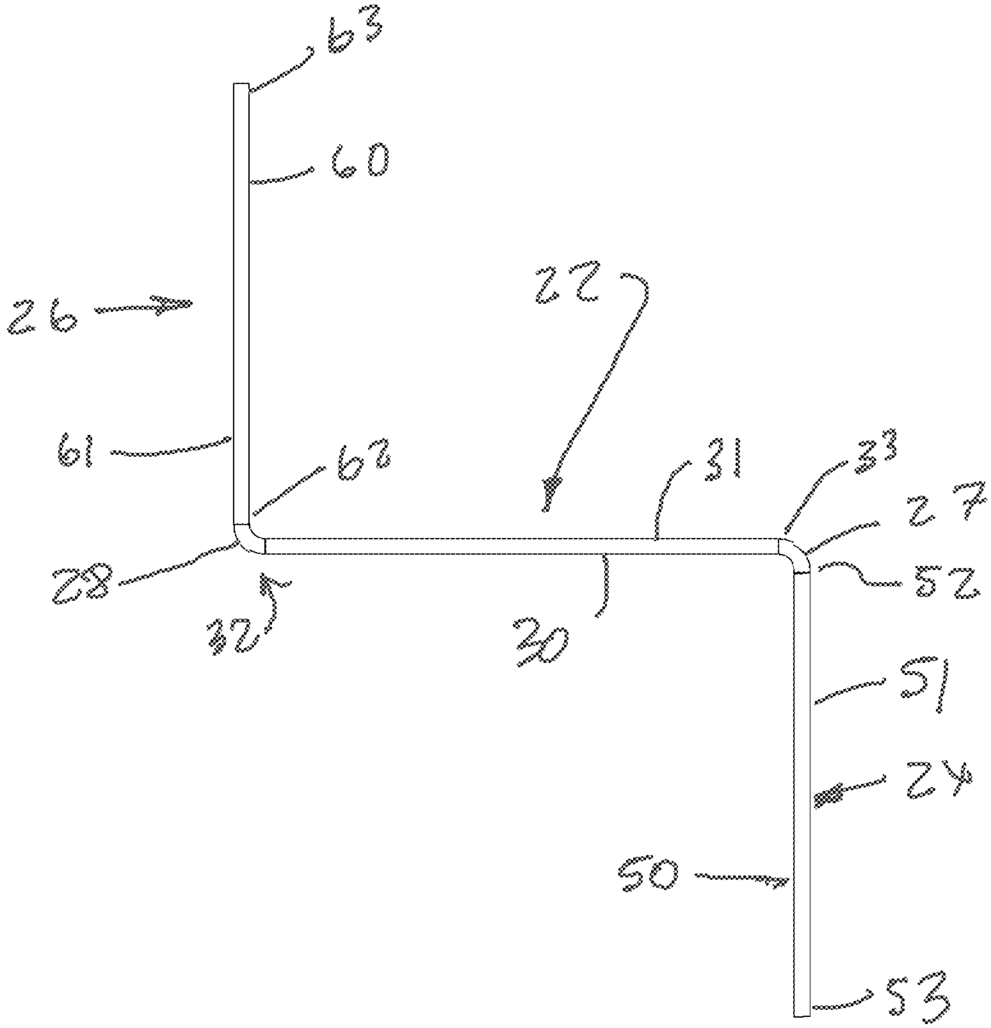
FIG. 5 of the drawings is a side elevational view of the bracket member of the present disclosure.
Figure 6:
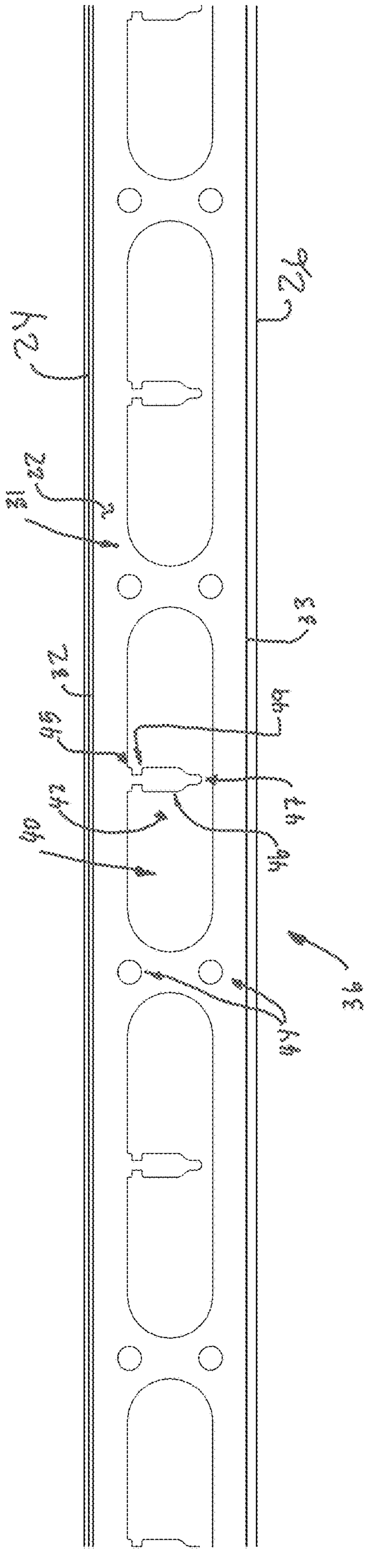
FIG. 6 of the drawings is a partial top plan view of the bracket member of the present disclosure, showing, in particular the central configuration of the body wall.
Figure 7:
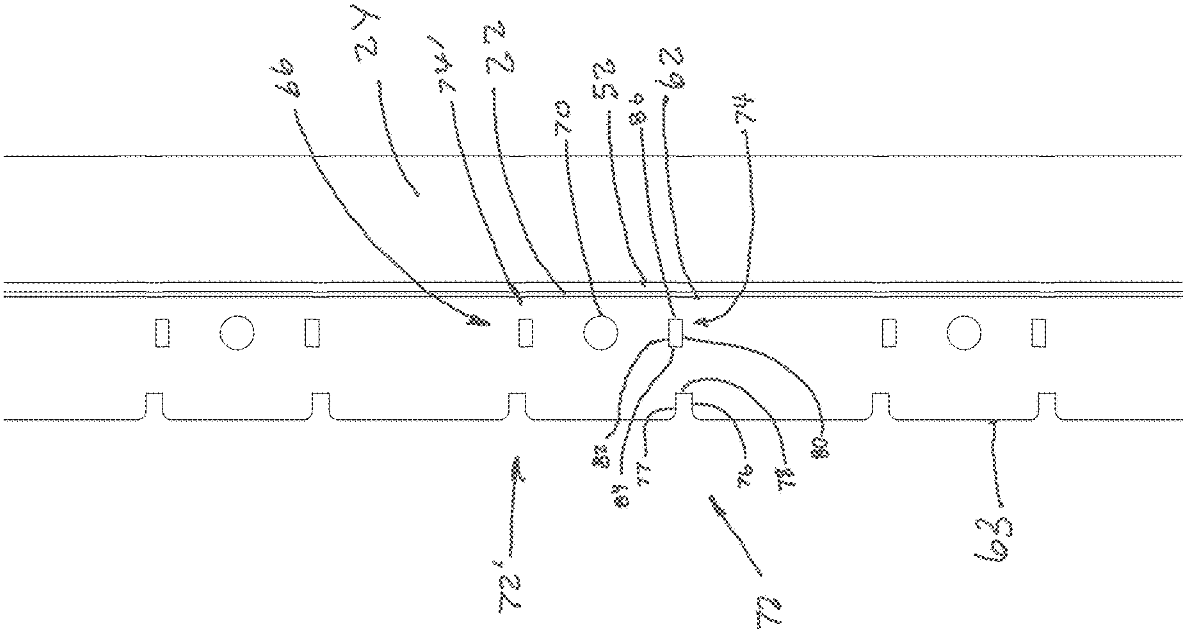
FIG. 7 of the drawings is a partial front elevational view of the bracket member of the present disclosure, showing, in particular the central configuration of the second end wall.
Figure 8:
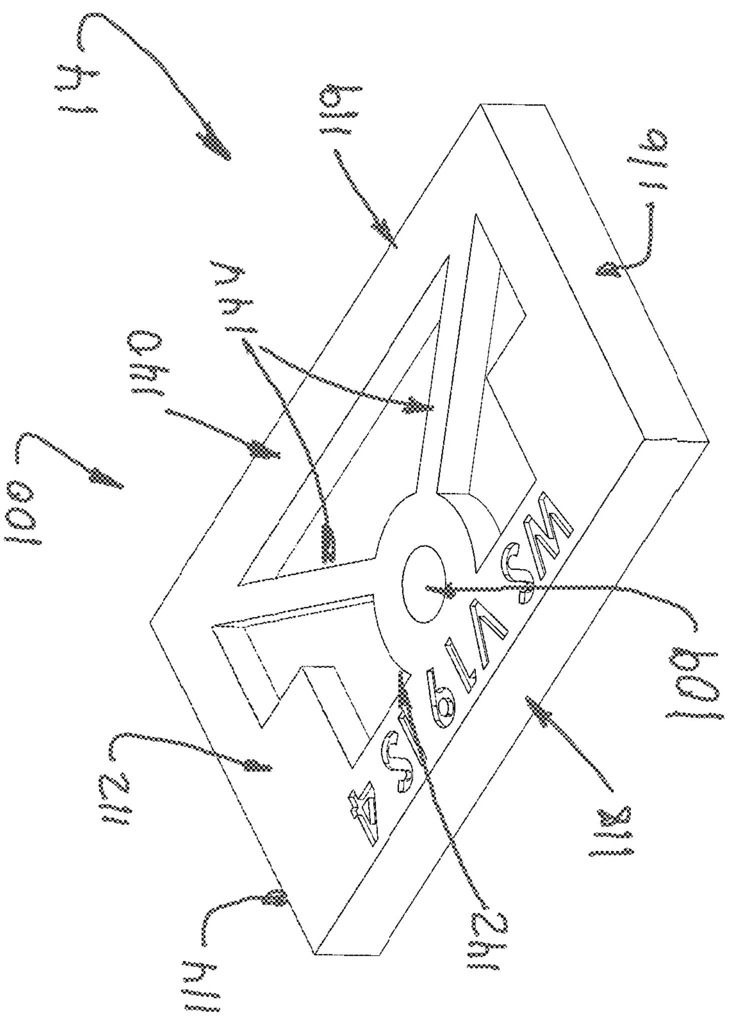
FIG. 8 of the drawings is a top perspective view of the attachment clip member of the present disclosure.
Figure 9:
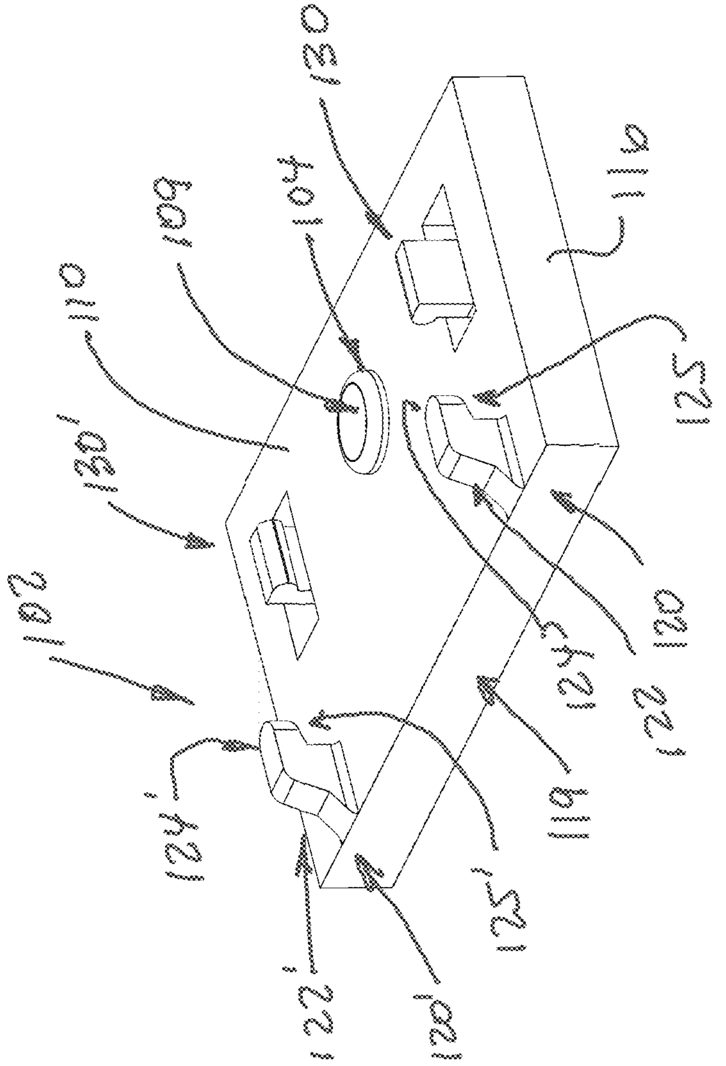
FIG. 9 of the drawings is a bottom perspective view of the attachment clip member of the present disclosure.
Figure 1D:
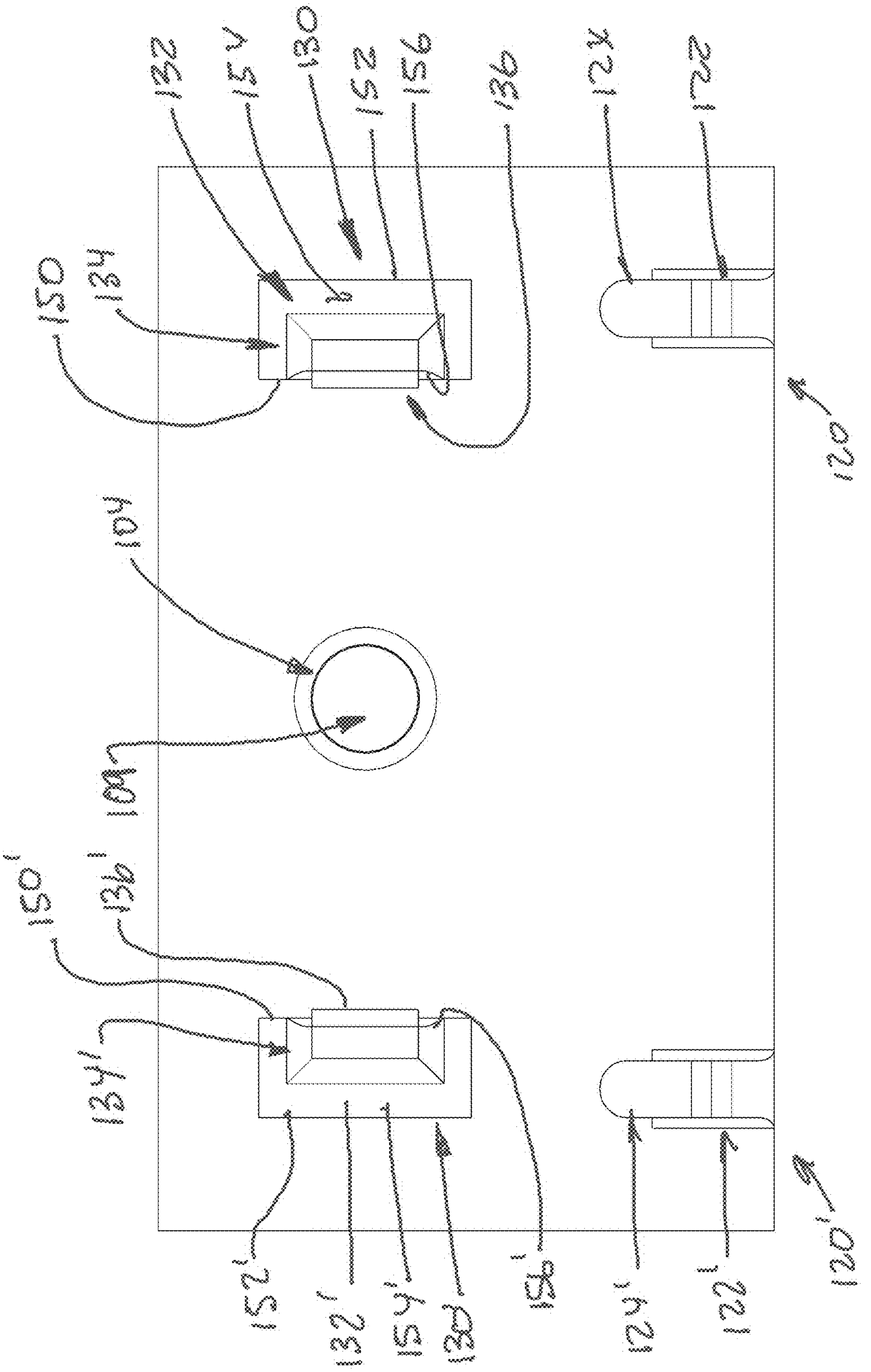
Figure 11:
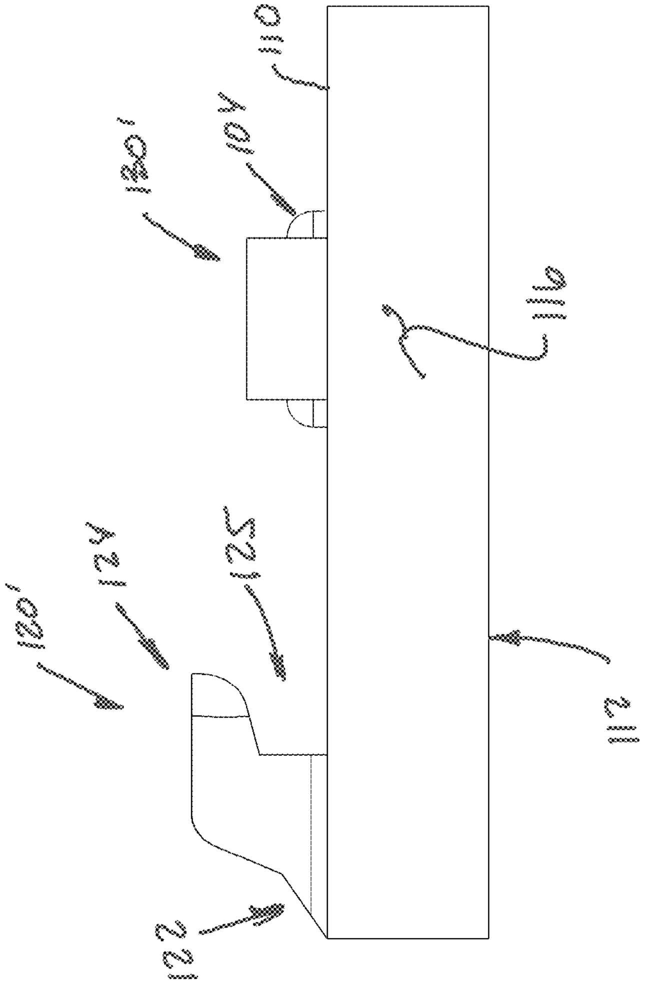
FIG. 11 of the drawings is a side elevational view of the attachment clip member of the present disclosure.

While this disclosure is susceptible of embodiment in many different forms, there is shown in the drawings and described herein in detail a specific embodiment(s) with the understanding that the present disclosure is to be considered as an exemplification and is not intended to be limited to the embodiment(s) illustrated.

It will be understood that like or analogous elements and/or components, referred to herein, may be identified throughout the drawings by like reference characters. In addition, it will be understood that the drawings are merely schematic representations of the invention, and some of the components may have been distorted from actual scale for purposes of pictorial clarity.

Referring now to the drawings and in particular to FIG. 1, the bracket assembly that is the subject of the present disclosure is shown generally at 10. The bracket assembly 10 is structurally configured for use in the construction of buildings. For example, the a plurality of such bracket assemblies can be attached to the outer surface of a building or building feature generally in a parallel and spaced apart configuration (typically vertically or horizontally). Cladding or the like can be coupled to the bracket opposite the outer surface with insulation positioned therebetween, which insulation is generally precluded or limited in movement by the bracket assemblies, in combination with the outer surface and the cladding. One such configuration is shown in FIG. 1, and will be described in greater detail below.

The bracket assembly 10 is shown in FIG. 1 as comprising bracket member 12 and attachment clip member 14. With reference to FIGS. 2 through 7, the bracket member 12 is shown as comprising an elongated member having a generally z-shaped cross-sectional configuration along the length thereof (while variations are contemplated in the way of openings, protective ribs or other structures, some of which can be stamped during production), defining first end 20 and second end 21. In one configuration, the bracket member comprises a stamped steel member wherein, the member can be stamped into the z-shaped configuration through conventionally known stamping equipment, and wherein the openings can likewise be formed through such known stamping equipment. The member may comprise a 16 to 24 gauge metal sheet that is stamped, while both thinner and thicker configurations are contemplated.

In the configuration shown, the bracket member 12 includes body wall 22, first end wall 24 and second end wall 26. The walls are generally positioned so as to be substantially perpendicular (+/−20°) to the adjacent wall, and wherein the joining is defined by first fold 27 and second fold 28 (defining what is commonly known as a Z-girt configuration). For example, first end wall 24 is substantially perpendicular to body wall 22, joined at first fold 27, and second end wall 26 is likewise substantially perpendicular to body wall 22 joined at second fold 28. The first end wall and the second end wall extend in opposite directions from the body wall, in the configuration shown.

In greater detail, body wall 22 includes front surface 30, back surface 31, top edge 32 and bottom edge 33, generally defining an elongated rectangular configuration, as the top edge and the bottom edge are substantially parallel to each other between first end 20 and second end 21. Proximate the first end 20 is first end configuration 34, with second end configuration 38 being proximate the second end 21, and a plurality of repeating central configurations, such as central configuration 36 therebetween. The first end configuration comprises an extended length being substantially void of openings extending through the surface thereof. In some configurations, the second end configuration 38 is shown as including an end void 48 that extends inwardly from the edge of the second end of the body wall. In the configuration shown, the end void defines a portion of a racetrack outer perimeter, defining an elongated U-shaped configuration. Other configurations are contemplated as well, the shape mimics the shape of a portion of the first void 40 of the repeating central configuration.

The central configuration 36 comprises a repeating set of openings that repeat between the first end configuration 34 and the second end configuration. It will be understood that in some configurations, the central configuration may not be repeating, but will have differently shaped openings between the first end and second end configurations, and the configuration is not limited to strictly repeating shapes and strictly repeating configurations therebetween.

In the configuration shown, the central configuration includes a plurality of first voids defined in a side by side configuration between the first end configuration and the second end configuration, and a plurality of ancillary voids that are positioned on either side of the first void along the length thereof between the first end configuration and the second end configuration.

The first void 36 will be described with the understanding that the remaining voids are positioned along the body wall at predetermined intervals. The first void 36 is shaped so as to define a racetrack opening, with spike member extending thereinto (with the understanding that the spike member is a part of the body wall). The racetrack opening is generally elongated in the direction of the longitudinal axis and is generally centered between the top and bottom edges 32, 33 of the body wall 22. The spike member includes a base 45, body 46 terminating in tip 47. In the configuration shown, the spike member is generally substantially perpendicular to each of the top and bottom edges 32, 33 of the body wall and extends from the elongated wall proximate the bottom edge 33 of the body wall, with the tip extending toward the top edge 32 of the body wall, while other configurations are contemplated. Base 45 includes a region that is relatively narrowed, thus, forming a bending location or axis (hereinafter bend location) 49 for the spike member 42. As can be seen in the configuration shown, the bend location 49 is spaced apart from the elongated wall proximate the bottom edge 33, so as to move the stress point away from the elongated wall. The tip 47, in the configuration shown, represents a narrowing over the last 5-60%, and more preferably between the last 5-30% of the spike member, so as to improve the penetration of the insulation when and if the spike member is utilized. It will be understood that the spike member can be bent so as to be substantially perpendicular to, or otherwise oblique to, the body wall.

Additional, ancillary voids, such as ancillary void 44 are disposed between the first voids. In the configuration shown, the ancillary voids comprise a pair of spaced apart openings (i.e., and without limitation, circular openings) that are spaced apart along a line that bisects the distance between adjacent first voids, and which line is substantially perpendicular to both the top edge 32 and the bottom edge 33. In the configuration shown, the ancillary voids terminate closer to the respective top and bottom edge than the first void, and have an opening that may be similar to the width of the spike member, while other configurations are contemplated. In the configuration shown, the ancillary voids are positioned on either side of the first voids, such that the central configuration ends with the ancillary voids on both ends thereof.

The first end wall 24, as set forth above, extends from the bottom edge 33 of the body wall 22, in the configuration show, at fold 27. The first end wall 24 includes inner surface 50 and outer surface 51, with proximal end 52 (at the fold 27) and distal end 53 opposite the proximal end. The inner surface 50, in the stamped configuration, is a continuation of the front surface 30 of the body wall, with the outer surface 51, in the stamped configuration, being the continuation of the back surface 31 of the body wall.

The first end wall is likewise substantially planar with a generally uniform thickness, and including a second end configuration 54 at the second end 21 of the bracket member. More specifically, a slot 56 is defined proximate the second end 21 of the first end wall, the slot preferably being closer to the proximal end than the distal end. In the configuration shown, the slot comprises an elongated slot that is elongated in the direction of the longitudinal axis of the bracket member. The elongated slot includes first end 57 and second end 58 with central bulge 59 therebetween. It will be understood that the central bulge is configured to initially receive a fastener, and as the bracket member expands and contracts, the relative position of the fastener with respect to the slot can be varied between the first end 57 and second end 58 of the slot 56.

Second end wall 26, as set forth above, extends from the top edge 32 of the body wall 22, in the configuration shown, at fold 28. The second end wall extends from the body wall in a direction opposite that of the first end wall 24, in the configuration shown. The second end wall includes inner surface 60 and outer surface 61, with proximal end 62 (at the fold 28) and distal end 63 opposite the proximal end. The inner surface 60, in the stamped configuration, is a continuation of the back surface 31 of the body wall, with the outer surface 61, in the stamped configuration, being the continuation of the front surface 30 of the body wall 22.

The second end wall is substantially planar with generally uniform thickness, and includes a first end configuration 64, a second end configuration 68 and a central configuration therebetween. The second configuration extends between the first end configuration and the second end configuration, and generally follows the central configuration of the body wall, in the configuration shown, while not being limited thereto.

The first end configuration comprises an extended length being substantially void of openings extending through the surface thereof, thus, matching the first end configuration of the body wall and the configuration of the first end wall proximate the first end 20 of the bracket member 12.

The second end configuration 68 is much like the second end configuration 54 of the first end wall. More specifically, a slot 90 is defined proximate the second end 21 of the second end wall, the slot preferably being closer to the proximal end than the distal end of the second end wall. In the configuration shown, the slot comprises an elongated slot that is elongated in the direction of the longitudinal axis of the bracket member. The elongated slot includes first end 92 and second end 94 with central bulge 96 therebetween. It will be understood that the central bulge is configured to initially receive a fastener, and as the bracket member expands and contracts, the relative position of the fastener with respect to the slot can be varied between the first end 92 and second end 94 of the slot 90.

In the configuration shown, the slot 90 of the second end wall 26 aligns with the slot 56 of the first end wall, and generally both are spaced substantially equally away from the proximal ends of the respective one of the first end wall and the second end wall. Additionally, the position of the central bulge generally corresponds to the bisection of the upper and lower linear portions of the end void 48.

The central configuration 66 repeats along predetermine intervals in a spaced apart configuration. In the configuration shown, the central configuration 66 repeats at intervals that substantially match the intervals of the central configuration 36 of the body wall 22, and being centered about he spike member 42 of each of the central configurations 36.

Each central configuration 66 comprises a fastener opening 70, outer attachment channels 72, 72' and inner attachment slots 74, 74'. In the configuration, the outer attachment channels and the inner attachment slots are generally centered about the fastener opening, and mirror images about a bisecting axis that is perpendicular to the proximal end 62 and that extends through the center of the fastener opening. Additionally, in the configuration shown, while the inner attachment slots and channels may overlap in their respective distances from the bisecting axis are such that the inner attachment slots are generally closer to the bisecting axis than the outer attachment channels. It will be understood that the fastener opening is configured to receive a fastener for attachment to an outside structure.

The outer attachment channel 72 will be described with the understanding that the outer attachment channel 72' is a substantial mirror image thereof about the bisecting axis. The outer attachment channel 72 includes first side 76, second side 77 and stop 78. The first and second sides both intersect the distal end 63 of the second end wall (where they meet at a filleted edge). The first and second sides are generally parallel to each other, and generally substantially perpendicular to the proximal end and/or the distal end. The stop 78 generally extends between the first and second sides 76, 77 at the innermost end of each, and is generally parallel to the proximal end 62 and/or the distal end 63 of the second end wall 26.

The inner attachment slot 74 will be described with the understanding that the inner attachment slot 74' is a substantial mirror image thereof about the bisecting axis. The inner attachment slot 74 comprises first side 80, second side 82, outer stop 84 and inner stop 86. The overall shape of the inner attachment slot comprises a rectangular configuration with the first and second sides being parallel to each other, and the outer and inner stops being parallel to each other, with the first and second sides being longer than the inner and outer stops. In the configuration shown, the first and second sides are generally substantially perpendicular to the proximal end 62 and/or the distal end 63, with the outer stop and the inner stop being substantially parallel thereto. The inner attachment slots are aligned with the fastener opening such that an axis perpendicular to and bisecting the first side 80 extends through the center of the fastener opening. In the configuration shown, the diameter of the fastener opening is larger than the length of the first and second sides 80, 82. Additionally, the inner stop is closer to the proximal end 62 than the outer stop is from the stop 78 of the outer attachment channel 72.

The relative positioning of the outer attachment channel 72 and the inner attachment slot 74 is such that the outer stop 84 of the inner attachment slot 74 is spaced apart and offset from the stop 78 of the outer attachment channel 72. An axis defined by the first side 76 of the outer attachment channel 72 extends through the inner and outer stops 84, 86 spaced apart from the first side 80 and the second side 82 (and may bisect the inner and outer stops in some configurations, or substantially bisect, i.e., +/−10%, the inner and outer stops). Similarly, an axis defined by the first side 80 of the inner attachment slot extends through the stop 78 of the outer attachment channel 72 between the first side 76 and the second side 77 thereof (and may bisect the stop 78 in some configurations, or substantially bisect, i.e., +/−10% the stop 78). While such relationships are described, variations are contemplated.

The central configurations repeat at predetermined intervals in a spaced apart configuration. In the configuration shown, the spacing is such that the distance between the first side 76 and the first side 76' at the stop 78 is greater than the distance between the first side 76 and the first side **76*a*' of an adjacent one of the central configurations, while variations are contemplated. In the configuration, the difference in distance amounts to less than the length of the stop 78**, while it may be varied in other configurations.

The attachment clip member 14 is shown in FIGS. 8 through 11 as comprising body 100, bracket coupling assembly 102, and central opening upstand 104 about fastener opening 109 (which opening is configured to correspond to fastener opening 70 of the central configuration 66 of the second end wall). In the configuration shown, attachment clip member 14 comprises a molded polymer member, and, in some configurations, a plurality of fibers within a resin matrix. It is contemplated that such members may be formed from any number of different polymers and may include any number of different fibers to increase the strength thereof. It is contemplated that the attachment clip member is formed as a single integrally formed component, while variations are contemplated.

The body 100 includes inner surface 110, outer surface 112, first side surface 114, second side surface 116, inner side surface 118 and outer side surface 119. The outer and inner surfaces are generally opposite of each other and define a thickness, which generally defines the width of the side surfaces. The configuration of the attachment clip member is generally rectangular cubic, with the outer and inner surfaces being generally parallel to each other, the first and second side surfaces being generally parallel to each other and the inner and outer surfaces being generally parallel to each other. In the configuration shown, the length of the inner and outer side surfaces is larger than the length of the first second side surfaces, while other configurations are contemplated (with the understanding that the overall dimensions are related to the central configuration 66 and the components thereof.

The outer surface comprises a substantially planar surface, with, in the configuration shown, a plurality of indentations, or, voids (hereinafter indentations) that are present therein, so as to define an outer perimeter 140, a encircling component 142 with supporting beams 144, 144'. The outer perimeter 140 extends about the entirety of the outer surface of the body 100. The encircling component 142 is formed into the outer perimeter 140 at an inner end thereof. The support beams 144, 144' extend from the encircling components outwardly toward the corners formed by the first and second side surfaces with the outer surface, respectively. The width of the beams is generally less than the axial width of the encircling component and the different portions of the outer perimeter. It will be understood that the indentations are positioned about regions which are not a part of the bracket coupling assembly 102, so as to not interfere with those components.

The inner surface 110 is generally planar (with the understanding that the bracket coupling assembly is formed therefrom or thereinto). Similarly, the first side surface, the second side surface, the inner side surface and the outer side surface are each generally planar, while variations are contemplated.

The bracket coupling assembly 102 is formed on and/or into the inner surface 110, as it will be understood that the inner surface, when assembled, abuts the outer surface 61 of the second end wall, with the bracket coupling assembly engaging the central configuration of the second end wall. The bracket coupling member 120 includes channel coupling members 120, 120' and slot coupling members 130, 130'. It will be understood that the bracket coupling member includes a snap together structure and a slide in structure that operate in different planes so as to be attached, while precluding separation in multiple directions.

The channel coupling members 120, 120' are positioned in a spaced apart configuration, with the channel coupling member 120 configured to engage with outer attachment channel 72 and the channel coupling member 120' configured to engage with attachment channel 72' when the attachment clip member 14 is attached to the bracket member 12. The channel coupling member 120 is substantially identical to and a mirror image of channel coupling member 120' about a line bisecting the body 100 between the inner side surface and the outer side surface extending through the center of the fastener opening 109. As such, channel coupling member 120 will be described with the understanding that any features that are discussed of the channel coupling member 120' will have the same reference numbers, augmented by a prime (').

The channel coupling member 120 includes raised body 122 terminating at inward leg 124, defining capture region 125. The raised body has an outer region that starts proximate the outer side surface and moves inboard thereof so as to be spaced apart from the outer side surface. The inward leg extends in a direction toward the inner side surface 118, with the capture region being defined by an inner wall of the raised body and a lower wall of the inward leg. As will be explained below with respect to the assembly, the channel coupling member 120 is configured to be insertable into the outer attachment channel 72 with the capture region capturing the region around the stop 78 between the first and second sides 76, 77.

The slot coupling members 130, 130' are positioned in a spaced apart configuration, with the slot coupling member 130 configured to engage with the inner attachment slot 74 of the second end wall of the bracket member and the slot coupling member 130' is configured to engage with the inner attachment slot 74' of the second end wall of the bracket member. The two slot coupling members 130, 130' are substantial mirror images of each other taken about a line bisecting the body 100 between the inner side surface and the outer side surface extending through the center of fastener opening 109. As such the slot coupling member 130 will be described with the understanding that any features that are discussed of the channel coupling member 130' will have the same reference numbers, augmented by a prime (').

The slot coupling member 130 includes trough 132, with arm 134 and distal protrusion 136 extending therefrom, defining a locking region. The trough 132 is formed into the inner surface 110 and defines a generally rectangular configuration having a base 154, an inner wall 150 and an outer wall 152 opposite the inner wall 150. The length of the inner and outer walls is greater than that of the first and second sides 80, 82 of the inner attachment slot 74.

The arm 134 has a cross-sectional configuration that corresponds to the configuration of the inner attachment slot 74, while allowing the arm and the distal protrusion to pass therethrough. The arm 134 extends from the base 154 of the trough 132 beyond the inner surface 110 of the body 100 of the attachment clip member 14. At a distal end of the arm 134, the distal protrusion 136 is formed as an inwardly directed protrusion along the length of the inner wall 156 of the arm 134. Upon insertion through the inner attachment slot 74, the distal protrusion 136 is configured to extend over the second side 82 of the inner attachment slot 74 so as to facilitate the capture of the bracket member between the inner surface 110 of the attachment clip member 14 and the distal protrusion 136 of the arm 134. It will be understood that that arm is configured to flex side to side so as to allow the arm 134 with distal protrusion 136 to pass through the inner attachment slot 74. It will be understood that, preferably, the inner wall 156 abuts the second side 82 of the inner attachment slot 74 when assembled so as to minimize relative movement. To effectuate the outward bending of the arm 134, the arm 134 is positioned so that the arm 134 is positioned closer to the inner wall 150 than the outer wall 152, while preferably being spaced apart from both (while other configurations are contemplated, including configurations without a trough).

In the configuration shown, the outer wall of the arm (i.e., opposite inner wall 156) substantially corresponds to an inner wall of the channel coupling member 122 so as to be substantially aligned.

The central opening upstand 104 encircles the fastener opening 109. And generally has a height that is substantially similar to +/−10% the thickness of the body wall 22. The upper edge may be curved such that alignment insertion through the fastener opening 70 is expedited and/or simplified. It will be understood that the central opening upstand encircles the fastener opening 109, so that upon insertion of a fastener, the fastener is generally precluded from contact with the bracket member by contacting the central opening upstand. It will be understood while the central opening is positioned generally centrally on the attachment clip member, the central opening may be positioned in any desired orientation on the attachment clip member, with the additional understanding that multiple openings may be provided (with, preferably, multiple openings on the bracket member).

To assemble a bracket assembly 10 of the present disclosure, a user is provided with at least bracket member 12 and a plurality of attachment clip members, such as attachment clip member 14. First, the user attaches each attachment clip member to the bracket member. A first one will be explained below, with the understanding that the remaining ones are achieved in a similar, if not identical manner.

In particular, the attachment clip member is first oriented relative to the bracket member so that the inner surface 110 is directed to overlie the outer surface 61 of the second end wall, generally aligning with outer attachment channels 72, 72' with the channel coupling members 120, 120'. Once generally aligned, the channel coupling members 120, 120' are slidably directed into the outer attachment channels 72, 72', respectively so that the stops 78, 78' are directed toward and into the capture regions 125, 125'. As the stops 78, 78' reach the capture regions 125, 125', the slot coupling members 130, 130' approach and at least partially overlie the respective ones of the inner attachment slots 74, 74', respectively. At such time, the slot coupling members 130, 130' can have their distal ends in contact with the outer surface 61 of the second wall, so that the inner surface 110 of the body 100 of the attachment clip member is angled relative to the outer surface of the second end wall.

As the slot coupling members overlie the inner attachment slots 74, 74', the outer surface 112 of the attachment clip member 14 can be pushed toward the outer surface 61 of the second end wall to drive the slot coupling members through the inner attachment slots. In greater detail, as force is applied to the attachment clip member, the distal protrusions 136, 136' of the slot coupling members 130, 130' are directed outwardly by the inner attachment slots 74, 74' (and, in particular, the second sides thereof). At some point, the elastic outward deformation is sufficient so as to move the distal protrusion out of the way of the outer surface of the second end wall bracket and through the inner attachment slots 74, 74'.

Once the distal protrusions 136, 136' extend beyond the inner attachment slots, they spring back to their original position wherein they overlie the inner surface 60 proximate the second sides 82, 82' of the inner attachment slots, thus, sandwiching the second end wall between the body and the distal protrusions 136, 136' of the slot coupling member 130, 130'.

At the same time, the central opening upstand 104 extends through the fastener opening 70 providing a barrier therearound.

Once fully coupled, the user can attach subsequent attachment clip members to the remaining central configurations of the bracket member to complete the bracket assembly. It will be understood that some of the central configurations may be skipped or omitted, so that a attachment clip member is not attached to each one of the central configurations of the bracket member.

Multiple bracket assemblies can be prepared in the same manner. Once multiples have been prepared, they can be attached to a building substrate, as is shown in FIG. 1. Specifically, and as set forth above, typically the bracket assemblies are placed in a vertical or in a horizontal spaced apart configuration, and wherein longer lengths are desired, they may be coupled end to end.

To first describe the coupling of a bracket assembly to a substrate, reference is made to FIG. 1. Specifically, the bracket assembly is placed onto the substrate such that the outer surface of the attachment clip member overlies the substrate. Next, fasteners can be directed through the fastener opening 70 of the bracket and through the central opening upstand 104 of the attachment clip member. Due to the configuration of the central opening upstand, the fasteners, preferably, do not contact the bracket member, and remain isolated therefrom.

If bracket members are attached end to end, it is contemplated that the second end configuration of a first bracket assembly overlie (or underlie) the first end configuration of an adjacent bracket assembly, with fasteners being directed through the slot of the second end configuration into the first end configuration (making an opening at the same time), thereby joining the two in an end to end configuration. Advantageously, as the bracket member expand and contract relative to each other, the two adjacent brackets can slide relative to each other as the screw that is directed through the slot into the first end of the second bracket assembly can travel along the slot substantially without impingement.

Figure 12:
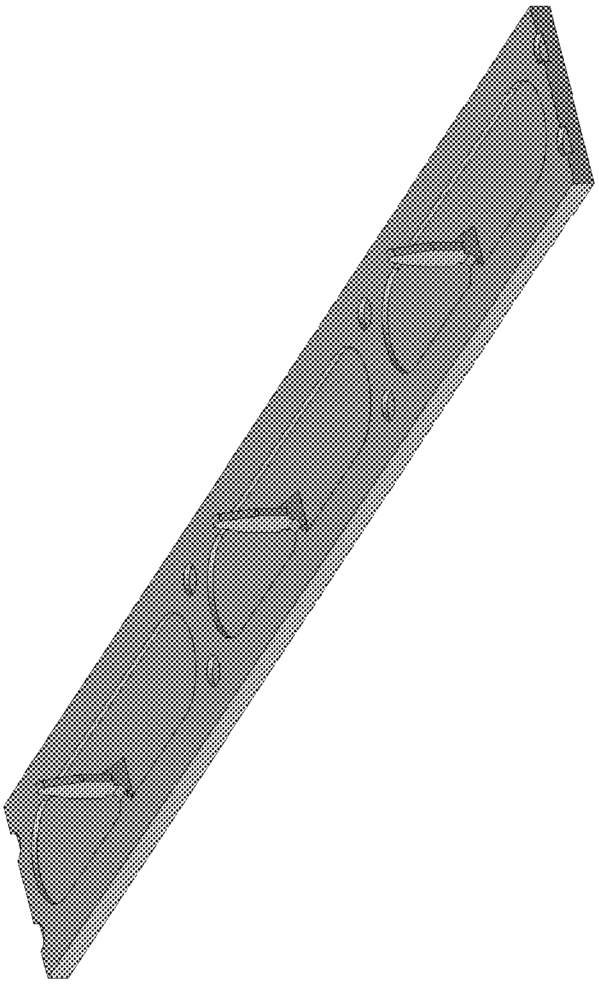
FIG. 12 of the drawings is a perspective view of a spike insertion tool that is configured to form openings or channels in insulation to receive spike members during installation.
Figure 13:
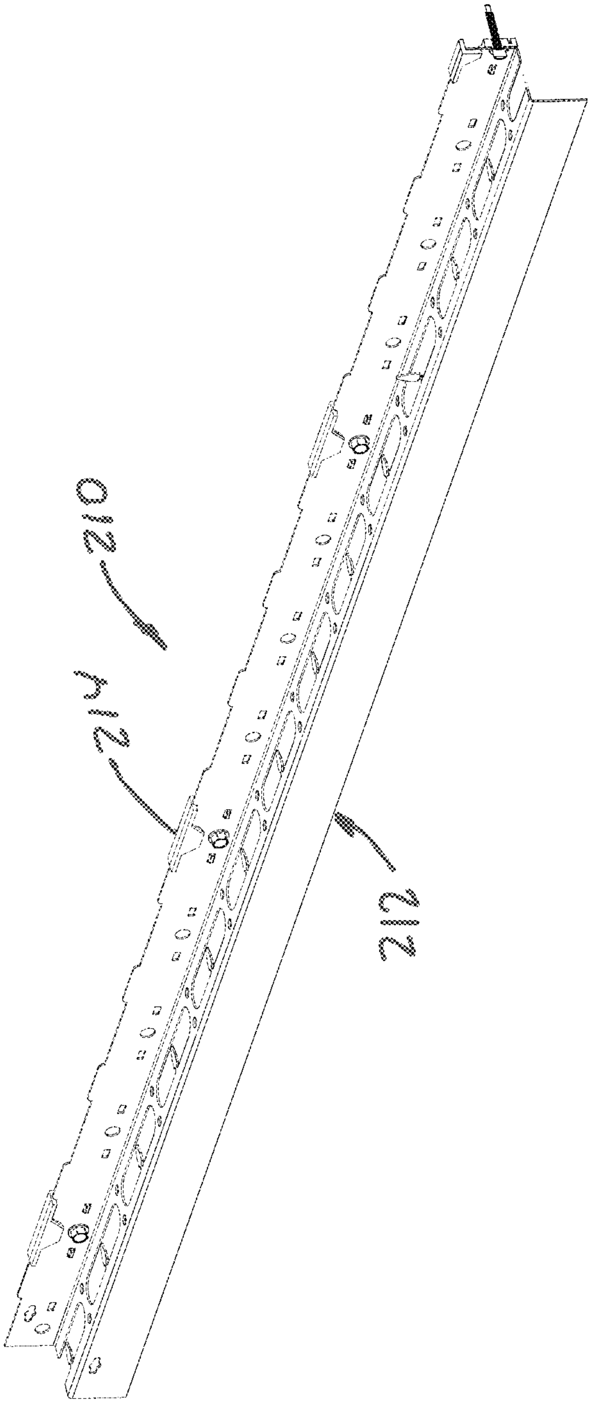
FIG. 13 of the drawings is a perspective view of a second configuration of the bracket member having attachment clip members installed thereon, with fasteners extending through each.
Figure 14:
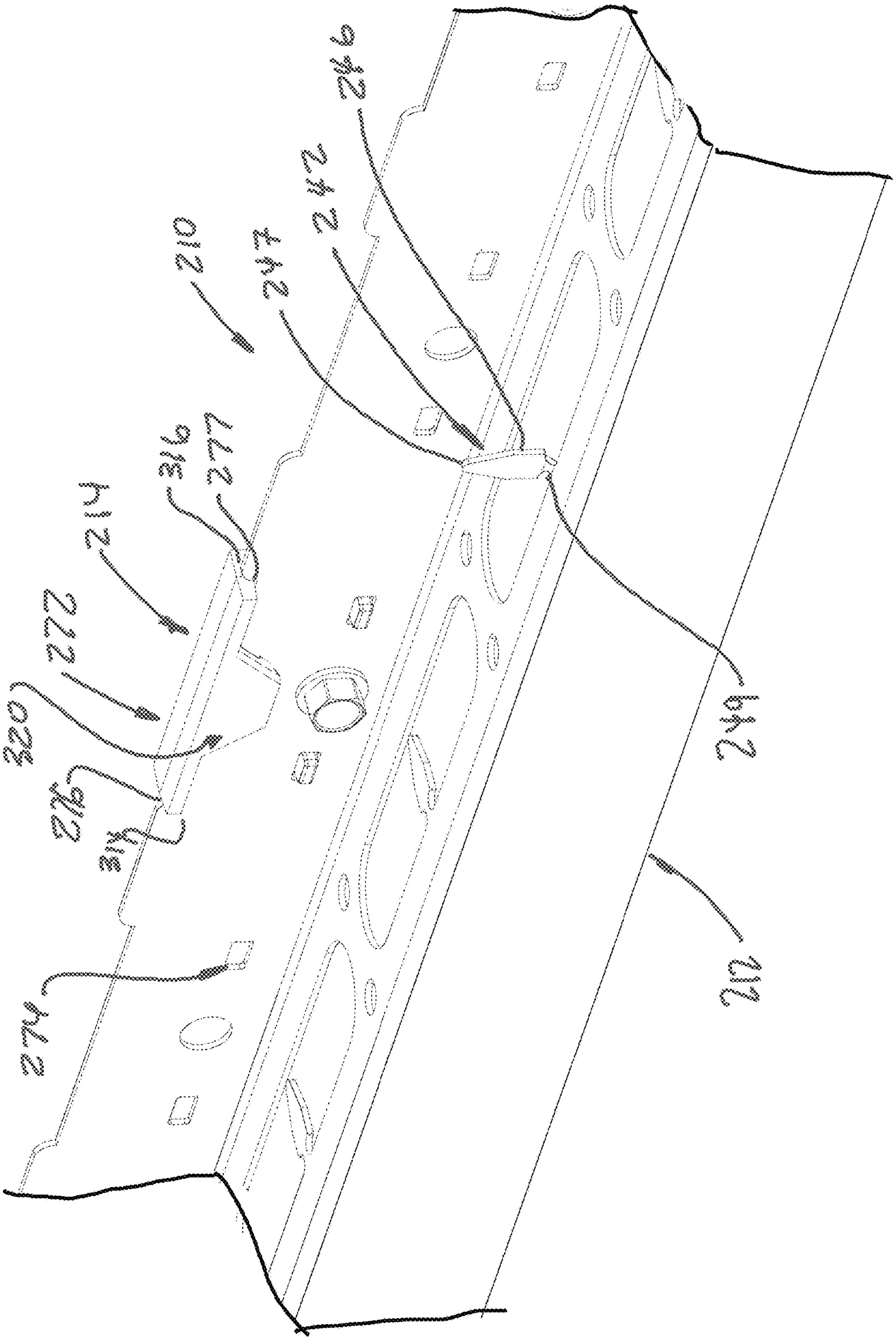
FIG. 14 of the drawings is a partial perspective view of the second configuration of the bracket member with an installed attachment clip member, and showing a bent spike member, that is bent about the bend region thereof.
Figure 15:
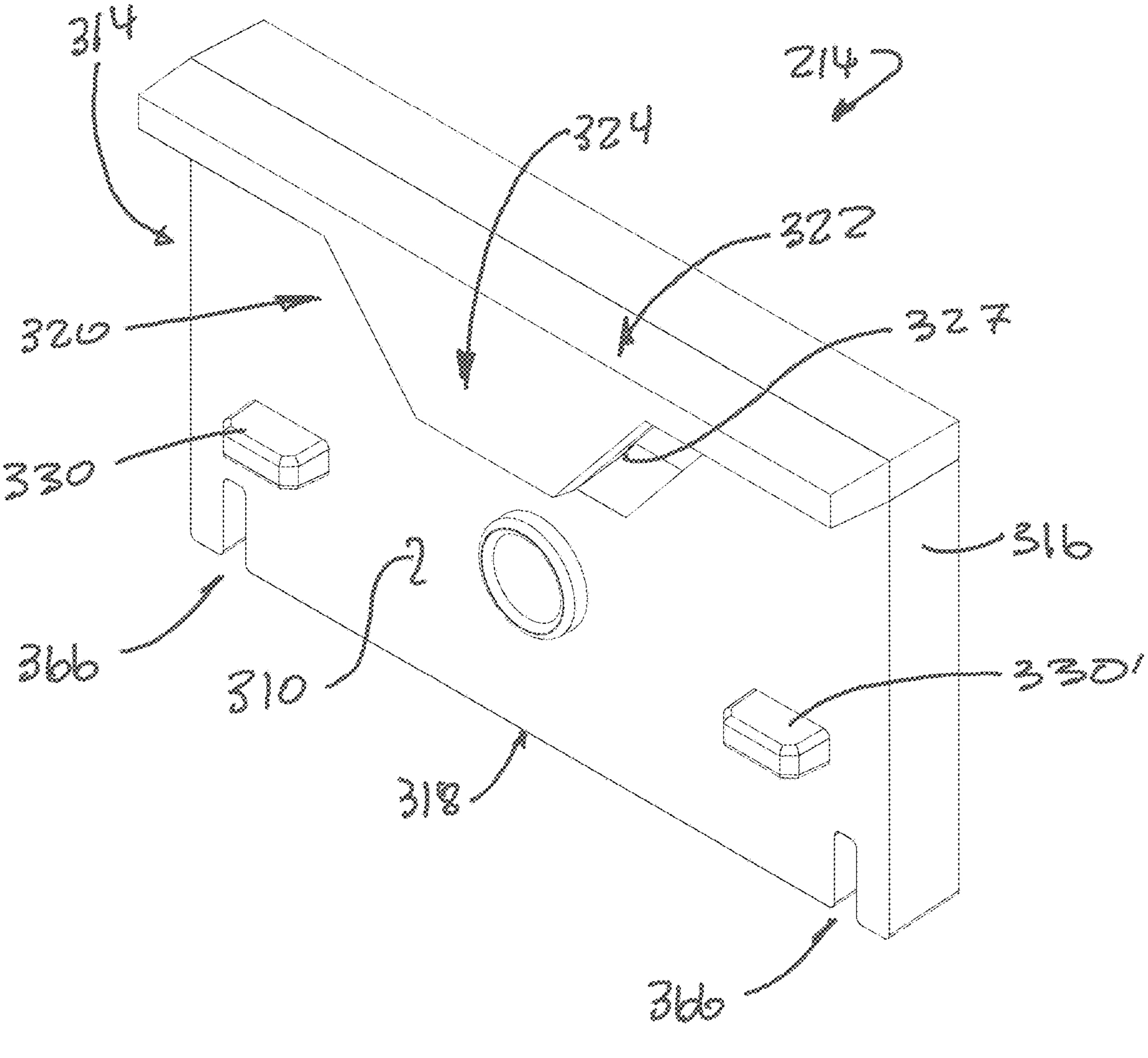
FIG. 15 of the drawings is a perspective view of the attachment clip member of the second configuration.
Figure 16:
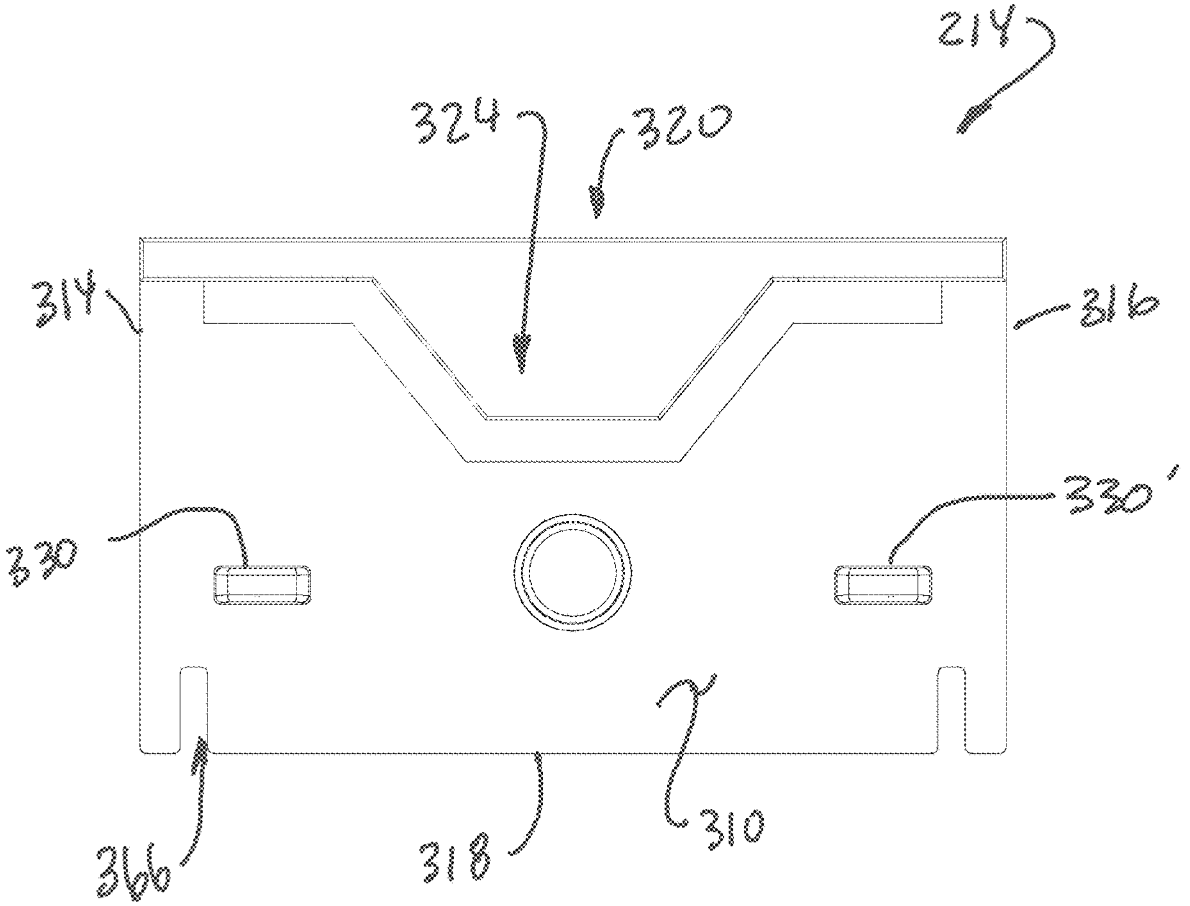
FIG. 16 of the drawings is a top plan view of the attachment clip member, showing the inner surface of the body along with the bracket coupling assembly and the central opening.
Figure 17:
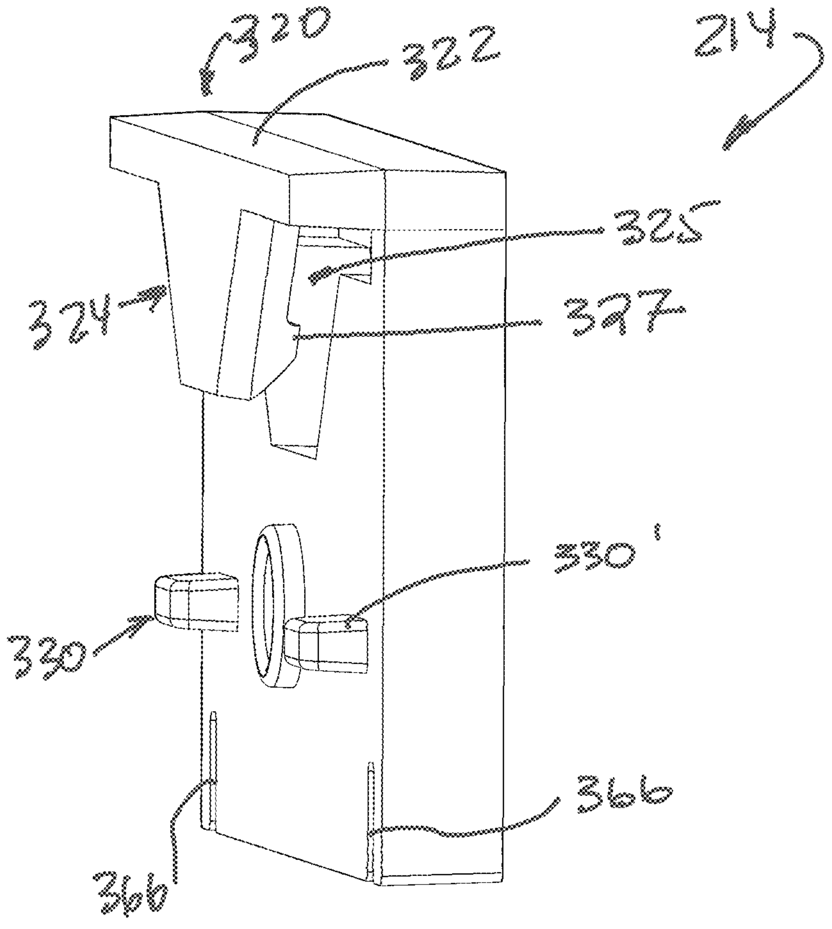
FIG. 17 of the drawings is another perspective view of the attachment clip member of the second configuration.
Figure 18:
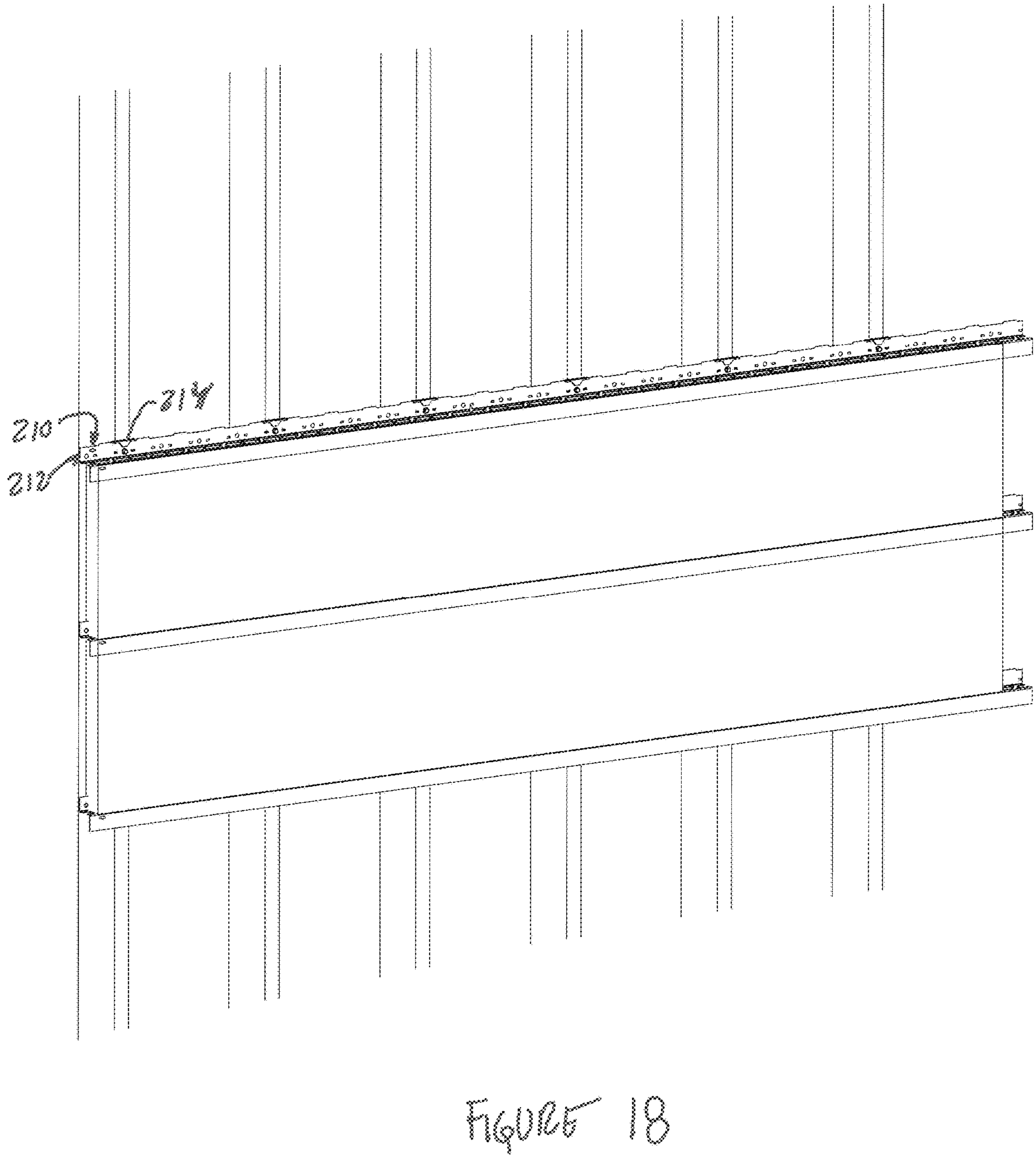
FIG. 18 of the drawings is a perspective view of a plurality of bracket members having attachment clip members mounted thereto, which are attached with fasteners to an underlying base substrate, and having insulation between adjacent ones of the bracket members.
Figure 19:
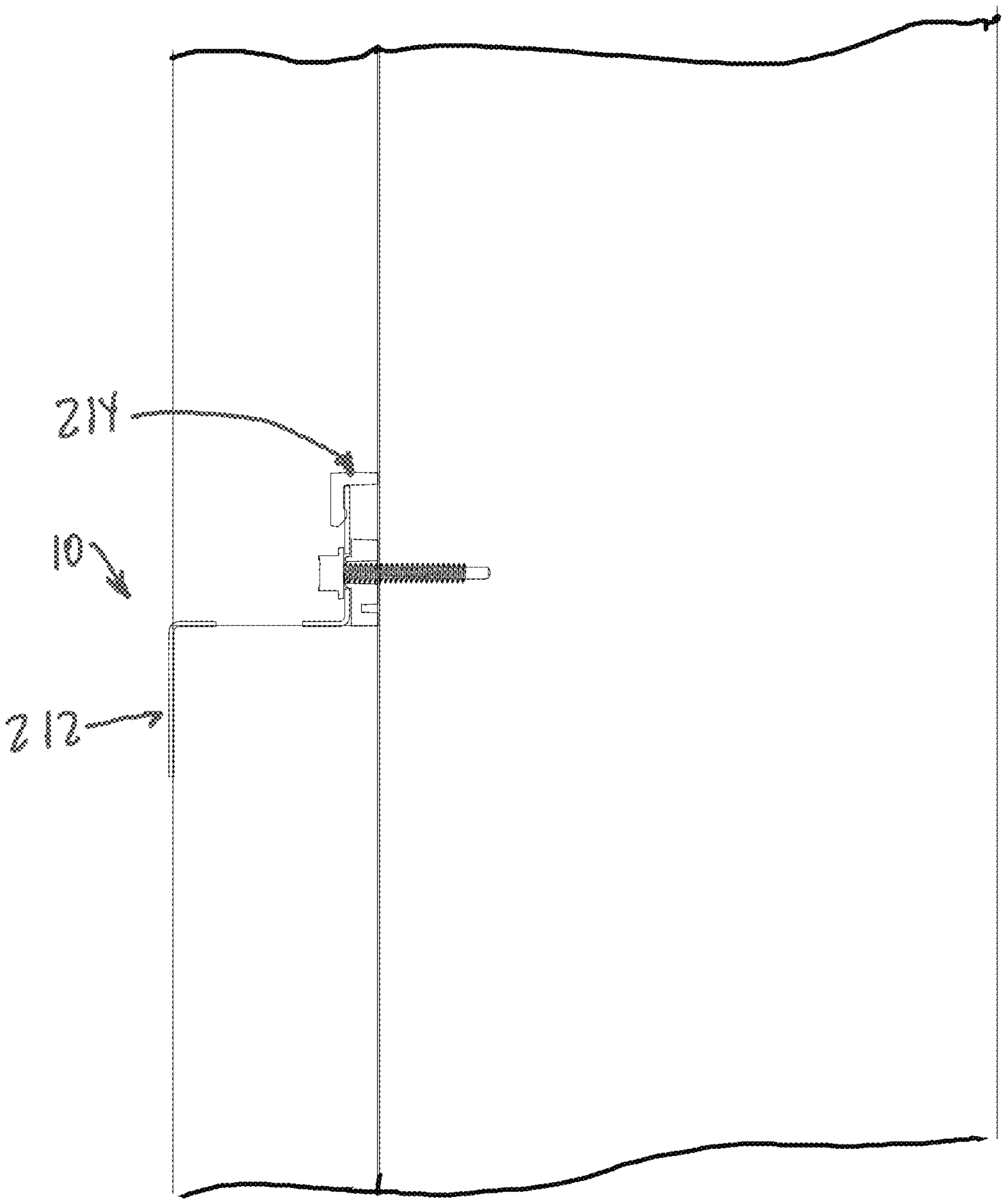
FIG. 19 of the drawings is a cross-sectional view of a bracket member with an attachment clip member, showing, in particular, the bracket attached to the base substrate with insulation installed on either side thereof.

Once the fasteners have coupled the bracket assembly to the substrate, the spike members 42 of the bracket assemblies can be bent about their respective bend regions 49 so that they are directed generally substantially perpendicular to the body wall 22. Thus, when insulation is positioned, the spike member can dig into the insulation to facilitate retention of the insulation in the proper position. Where the insulation is heavier, thicker or more difficult to penetrate, a spike insertion tool, such as the tool shown in FIG. 12, can be used on the insulation prior to installation to pre-make the openings in the insulation to further facilitate the interaction between the spike members of the bracket and the insulation.

It will be understood that each of the spike members can be bent, or some can be bent, and they can be bent in either direction depending on the particular configuration. Once the insulation has been installed and the bracket assemblies have been installed, cladding can be installed over the insulation, with fasteners extended through the cladding and into the first end wall of the bracket members, thereby completing the construction.

Another configuration is shown in FIGS. 13 through 19. With such a configuration, like reference numbers have been utilized for like components, augmented by 200. In the configuration shown, and with reference to FIGS. 13 and 15, the spike member 242 is shown as having a slightly different configuration having body 246 and tip 247, with the bend region 249 extending to the void (such that the bend region essentially forms the bend region and with void forms the base). Of course, other configurations of the spike member are likewise contemplated.

Additionally, instead of having multiple outer attachment channels for engagement with each of the attachment clip members, a single (and in this configuration, larger) configuration is shown at 272. Such a configuration includes first side 276, second side 277 and stop 278. The channel is shown as engaging the bracket coupling assembly 302 of the attachment clip member 314 (as will be described). Furthermore, the inner attachment slots generally comprise rectangular shapes, however, in the configuration shown, the rectangular shapes are such that they appear to be rotated 90°, such that the longer sides are the short sides and the short sides are the longer sides. Of course, other configurations are contemplated for the inner attachment slots.

The attachment clip member 214 is shown as including transverse slots 366 that are positioned on either end of the body proximate the inner side surfaces 318. The metal bracket member can be positioned in either one of the transverse slots so that it can be bent or otherwise deformed (i.e., as if the attachment clip member forms a wrench or the like). For example, the spike member can be placed into one of the transverse slots so as to be bent about the bend region thereof. Similarly, a damaged bracket member, for example, can be straightened using the transverse slots 366 with leverage provided by the shape of the attachment clip member.

Furthermore, a single channel coupling member 320 may be utilized to interface with the outer attachment channel 272. The channel member has a raised body 322 that spans between the first side surface 314 and the second side surface 316, and engages with the first side 276 and second side 277. At the same time, the inward leg 324 comprises a trapezoidal configuration that terminates in an inwardly directed tab 327. In the configuration shown, the inwardly directed tab engages the inner surface of the second end wall. Additionally, in the configuration shown, the body may include a void region opposite the channel coupling member.

In the configuration shown, the slot coupling members 330 may each comprise a tab that extends outwardly from the inner surface 310 of the attachment clip member 214. The tab member shape corresponds to the inner attachment slots and tapers inwardly, without engaging the inner surface of the second end wall.

It is contemplated that the foregoing structures may be mixed and matched with respect to the different configurations. For example, the slot coupling members 330 of the configuration shown in FIGS. 9 through 11, may be utilized with the second configuration of the channel coupling member. It will also be understood that the second configuration of the slot coupling member may be utilized with the first configuration of the channel coupling member. In addition, the transverse slots can be added to the first configuration. The configuration of the channel coupling member may be reconfigured into multiple such channel coupling members of a similar shape so as multiple channel coupling members can be utilized, much like as with the first configuration. Other features of the second configuration can be mixed with features of the first configuration. And, it will further be understood, further variations are contemplated.

The foregoing description merely explains and illustrates the disclosure and the disclosure is not limited thereto except insofar as the appended claims are so limited, as those skilled in the art who have the disclosure before them will be able to make modifications without departing from the scope of the disclosure.

What is claimed is:

1. A bracket assembly comprising:

a bracket member being elongated and including:

a body wall, a first end wall and a second end wall, the first end wall extending from a bottom edge of the body wall and the second end wall extending from a top edge of the body wall, with the first end wall being substantially perpendicular to the body wall and the second end wall being substantially perpendicular to the body wall;

the body wall having a plurality of body wall central configurations along a length of the bracket member, at least one of the plurality of body wall central configurations defining a first void within the body wall with a spike member formed to extend into the first void, the spike member having a body and a tip, and being bendable so as to be at least one of oblique and perpendicular to the body wall;

the second end wall having a plurality of second end wall central configurations along the length of the bracket member, at least one of the plurality of second end wall central configurations having at least one outer attachment channel formed into a distal end of the second end wall, at least one inner attachment slot disposed between a proximal and a distal end of the second end wall;

at least one attachment clip member positionable on an outer surface of the second end wall, and attachable to the bracket member, the at least one attachment clip member including:

a body having an inner surface and an outer surface, along with an outer side surface and an inner side surface opposite the outer side surface and extending between the inner surface and the outer surface, with the inner surface positionable over the outer surface of the second end wall;

at least one channel coupling member insertable into the at least one outer attachment channel with a portion extending of the at least one channel coupling member extending over an inner surface of the second end wall;

at least one slot coupling member having an arm extendable through the at least one inner attachment slot, whereupon attachment of the at least one channel coupling member and the at least one slot coupling member attaches the at least one attachment clip member to the bracket member.

2. The bracket assembly of claim 1 wherein the bracket member further comprises a metal member formed from a single sheet, wherein the first end wall and the body wall are defined by a first fold therebetween, and wherein the second end wall and the body wall are defined by a second fold therebetween, with the first fold extending in a direction opposite of the second fold, so as to define a Z-girt configuration.

3. The bracket assembly of claim 2 wherein the at least one attachment clip member comprises a polymer.

4. The bracket assembly of claim 3 wherein the at least one attachment clip member comprises an injection molded polymer.

5. The bracket assembly of claim 1 wherein at least one of the first end wall and the second end wall further includes a second end configuration, structurally configured to facilitate the passage of a fastener therethrough for attachment of successive brackets in an end to end configuration with overlapping, the second end configuration includes a slot that has a central bulge with opposing ends extending therefrom.

6. The bracket assembly of claim 1 wherein the base wall central configuration further includes a plurality of ancillary voids positioned between adjacent first voids of at least some of the plurality of base wall central configurations.

7. The bracket assembly of claim 6 wherein the ancillary voids are each smaller than the first void.

8. The bracket assembly of claim 1 wherein the at least one inner attachment slot further comprises a pair of attachment slots that are spaced apart from each other with a central opening positioned therebetween.

9. The bracket assembly of claim 1 wherein the at least one outer attachment channel comprises a pair of outer attachment channels that are spaced apart from each other.

10. The bracket assembly of claim 1 wherein the spike member is bendable about a bend region spaced apart from the tip, the bend region facilitating the controlled bending of the spike member so as to be one of oblique and perpendicular to the body wall.

11. The bracket assembly of claim 1 wherein the at least one attachment clip member comprises a plurality of attachment clip members attached to the bracket member in a spaced apart configuration.

12. The bracket assembly of claim 1 wherein the at least one channel coupling member further comprises:

a raised body portion extending from the inner surface of the body; and an inward leg extending from the raised body portion so as to define a capture region between the raised body portion, the inward leg and the body of the attachment clip member.

13. The bracket assembly of claim 12 wherein the inward leg further includes an inwardly directed tab portion.

14. The bracket assembly of claim 12 wherein the at least one channel coupling member further comprises a pair of spaced apart channel coupling members.

15. The bracket assembly of claim 12 wherein the raised body portion spans from a first side surface of the body to the second side surface of the body, with the inward leg being spaced apart from the first and second side surfaces.

16. The bracket assembly of claim 1 wherein the at least one slot coupling member further comprises an arm extendable through the at least one inner attachment slot, with a distal protrusion structurally configured to engage the bracket member upon insertion so as to sandwich a portion of the bracket member therebetween.

17. The bracket assembly of claim 1 wherein the at least one second end wall central configuration further includes a central opening extending therethrough, the at least one attachment clip member further including a central opening structurally configured to align with the central opening of the at least one end wall central configuration.

18. The bracket assembly of claim 17 wherein the central opening of the attachment clip member further includes an upstand that, when attached to the bracket member, engages the central opening of the bracket member.

19. A method of assembling a bracket assembly of claim 1, the method comprising the steps of:

providing a bracket member;

providing a plurality of attachment clip members;

attaching each of the plurality of attachment clip members to the bracket member.

20. The method of claim 19 further comprising the step of:

directing a fastener through the bracket member and through the attachment clip member and into an outside substrate.

* * * * *